United States Patent [19]
Cohn et al.

[11] Patent Number: 6,167,064
[45] Date of Patent: Dec. 26, 2000

[54] METHOD AND SYSTEM IN AN INTELLIGENT COMMUNICATIONS NETWORK FOR A PROGRAMMABLE CALL CONTROL UTILIZING REMOVABLE CONFIGURABLE CONTROL MECHANISMS

[75] Inventors: Daniel Cohn; Rohit Gupta, both of Plano, Tex.

[73] Assignee: Nortel Networks Corporation, Montreal, Canada

[21] Appl. No.: 09/037,371

[22] Filed: Mar. 10, 1998

[51] Int. Cl.[7] ....................................................... H04J 3/12
[52] U.S. Cl. ........................... 370/522; 370/410; 455/552
[58] Field of Search .................................... 455/426, 552; 370/410, 522, 523, 524, 328, 338

[56] References Cited

U.S. PATENT DOCUMENTS 6,044,265  3/2000  Roach ................................ 455/552 X Primary Examiner—Joseph L. Felber
Attorney, Agent, or Firm—Kenneth W. Bolvin; Felsman, Bradley, Vaden, Gunter & Dillon, LLP

[57] ABSTRACT

A method and system for implementing a communications network having configurable control mechanisms for the identification and transference of particular types of communications data. Detection points are established within the communications network, wherein particular types of communications data transferred through the detection points may be identified. Removable configurable control mechanisms are associated with the detection points mechanisms that manage the transference of communications data through the detection points, such that the removable configurable control mechanisms may be easily replaced and updated without deconstructing the communications network or extensively delaying communication services within the communications network. The communications network can include a wireless or wireline communications or a combination thereof. The configurable control mechanisms include triggers within calls or communication transactions which can be armed to transfer control and call-related information to external nodes that may be composed of off-board service platforms.

36 Claims, 10 Drawing Sheets

Fig. 4

WIN Trigger Attributes

| Attribute | Description |
|---|---|
| TDP | Trigger Detection Point at which the trigger can be detected. |
| Category | *Subscriber Triggers* for a specific subscriber, datafilled against the subscriber's HLR profile.<br><br>*MSC Group Triggers* for a group of subscribers, datafilled against the MSC service group (e.g., MIN ranges).<br><br>*Office-wide Triggers* for all subscribers roaming within the MSC. |
| Interface | Type of interface to which it can be assigned (e.g., inter-office trunk mobile origination, mobile termination). |
| Precedence | Order of arming for a specific trigger when originated by more than one service (e.g., Subscriber triggers have precedence over group triggers; group triggers have precedence over office triggers). |
| Priority | Order of detection criteria evaluation among triggers at a specific DP. |
| DP Criteria | The conditions which must be met for a trigger to be detected. |
| WIN Query Message | Message to be sent when trigger is detected. |
| Arming Mechanism | Identifies the mechanisms by which the trigger is armed. |
| Fault Handling | Defines fault handling procedures for the case when the SCF does not respond to the SSF/CCF message. |

METHOD AND SYSTEM IN AN INTELLIGENT COMMUNICATIONS NETWORK FOR A PROGRAMMABLE CALL CONTROL UTILIZING REMOVABLE CONFIGURABLE CONTROL MECHANISMS

BACKGROUND OF THE INVENTION

1. Technical Field

The present invention relates in general to an improved communications network. In particular, the present invention relates to wireless and wireline communication networks. More particularly, the present invention relates to intelligent and configurable communications networks. Still more particularly, the present invention relates to communication networks having detection points within calls which include triggers that can be armed to transfer control and call-related information to off-board service platforms.

2. Description of the Related Art

Communication networks such as wireless and wireline telephone systems are well-known in the prior art. A wireline based communications system utilizes a physical path to transmit signals. Examples of wireline communications systems include telephone, telegraph, facsimile, closed circuit television and so forth. Examples of wireless communication systems include cellular telephone systems. A cellular telephone system typically includes cellular subscriber units that can be mobile or portable, and cellular base stations which are connected to the public telephone company via one or more cellular switching networks. Each cellular subscriber has an assigned cellular telephone number which allows the user (i.e., the cellular subscriber) to place and receive calls within a widespread range of the cellular base stations, such as throughout a metropolitan area.

Computerized switching is essential to the operation of both wireline and wireless telephone communication systems. Telephone communication networks typically provide features for redirecting calls on behalf of telephone users. Examples of such features include call forwarding, call transfer, release link trunking, and simultaneous ringing, all well known in the communications arts. Call forwarding, for example, is a network-provided service feature in which calls may be redirected from the originally called address to another address specified by a call forwarding party.

Wireless and wireline switches in "intelligent" communication networks typically provide detection points within which calls may be armed via triggers to transfer control and call-related information to off-board service platforms. Triggers at these detection points are typically defined in terms of detection criteria, message interface, and priority. Conventionally, industry standards specify these attributes for every supported trigger. This approach places a limitation on the introduction of new triggers without the adoption of new standards. Thus, implementation of new triggers to support demand for new services is a formidable challenge. Additionally, this requires costly software changes which delay deployment of new services in the marketplace. The communication networks in which such wireless and wireline switches are utilized may be deconstructed at worst, or actively delayed at the least, in order to update these triggers. Based on the foregoing, it can thus be appreciated that a need exists to allow users of communication networks to easily and efficiently enhance, update, or replace these triggers without delaying communication transactions or being forced to make extensive and costly alterations to the communications network.

SUMMARY OF THE INVENTION

It is therefore one object of the present invention to provide an improved communications network.

It is therefore another object of the present invention to provide an improved communications network in which wireless and wireline communication devices can be utilized to initiate communication transactions.

It is yet another object of the present invention to provide an improved communications network having detection points within calls which include triggers that can be armed to transfer control and call-related information to off-board service platforms.

It is still another object of the present invention to provided a configurable communications network that allows triggers to be removed, updated, and enhanced without interrupting, deconstructing or implementing a new communications network in place of the original communications network.

The above and other objects are achieved as is now described. A method and system for implementing a communications network having configurable control mechanisms for the identification and transference of particular types of communications data. Detection points are established within the communications network, wherein particular types of communications data transferred through the detection points may be identified. Removable configurable control mechanisms are associated with the detection points mechanisms that manage the transference of communications data through the detection points, such that the removable configurable control mechanisms may be easily replaced and updated without deconstructing the communications network or extensively delaying communication services within the communications network. The communications network can include a wireless or wireline communications or a combination thereof. The configurable control mechanisms include triggers within calls or communication transactions which can be armed to transfer control and call-related information to external nodes that may be composed of off-board service platforms.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 4 depicts a table illustrating Wireless Intelligent Networking (WIN) trigger attributes, in accordance with a preferred embodiment of the present invention;

DETAILED DESCRIPTION OF PREFERRED EMBODIMENT

Figure 1:
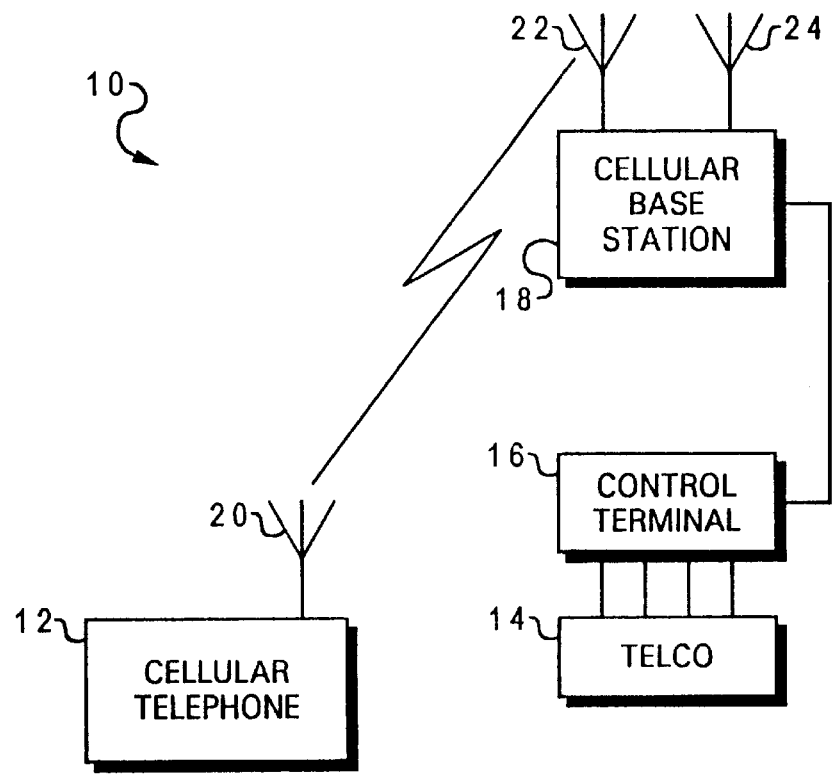
FIG. 1 illustrates a block diagram illustrative of a cellular telephone system in which a preferred embodiment of the present invention may be implemented.

With reference now to the figures and in particular with reference to FIG. 1, there is depicted a block diagram of a cellular telephone system 10 in which a preferred embodiment of the present invention may be implemented. The cellular telephone system 10 depicted in FIG. 1 includes a telephone company phone system (TELCO) 14, connected by telephone landlines to a control terminal 16 which in turn is coupled, also by telephone landlines, to a cellular base station 18 that is located in a cell of a mobile cellular telephone system. Those skilled in the art will appreciate that cellular telephone system 10 is one type of a communications system which may be utilized in accordance with a preferred embodiment of the present invention. For example, non-cellular, wireline and other such implemented telephone systems may be utilized in accordance with a preferred embodiment of the present invention. Cellular telephone system 10 as described herein is presented for illustrative purposes only.

Cellular telephone 12 communicates with cellular base station 18 via antennas 22 and 20. Antennas 22 and 20 can be implemented as telescopic whip antennas that extend or retract (i.e., lengthen or shorten), by being constructed in the form of overlapping concentric cylinders that slide inside of each other and make electrical contact with each other. It will be appreciated by those skilled in the art that such antennas are, of course, only examples of antennas that can be utilized with a cellular telephone system such as cellular telephone system 10. A wide variety of other antennae can also be utilized in conjunction with a wireless communication system such as cellular telephone system 10. Also, the landlines utilized in association with cellular telephone system 10 are lines that can be placed in areas on land or inland waterways, and can include twisted-pair lines, coaxial cables, and fiber optic cables utilized in overhead, direct buried, underground, microwave, and satellite applications.

Additional cellular base stations may be located throughout a geographic area to provide telephone service to cellular telephones 12. Cellular base station 18 incorporates both a receiver antenna 22 and a transmitter antenna 24 for communicating with cellular telephone 12. Cellular telephone 12 may be a mobile-unit installed in a vehicle, a transportable unit which is a mobile-unit and battery installed in a carrying case, or a hand-held portable unit. Cellular telephone 12 includes an antenna 20 for the cellular radio channels. In the United States, the cellular radio channels are in the frequency band from 824–894 MHz. More particularly, in the United States, a total bandwidth of 50 MHz is allocated for cellular mobile service, the 50 MHz distributed between 824 MHz and 849 MHz, and 869 MHz and 894 MHz of the frequency spectrum. Also, recently the FCC has auctioned off bandwidths in the 1.9 GHz range. All of these bands can be utilized in accordance with a preferred embodiment of the present invention.

Figure 2:
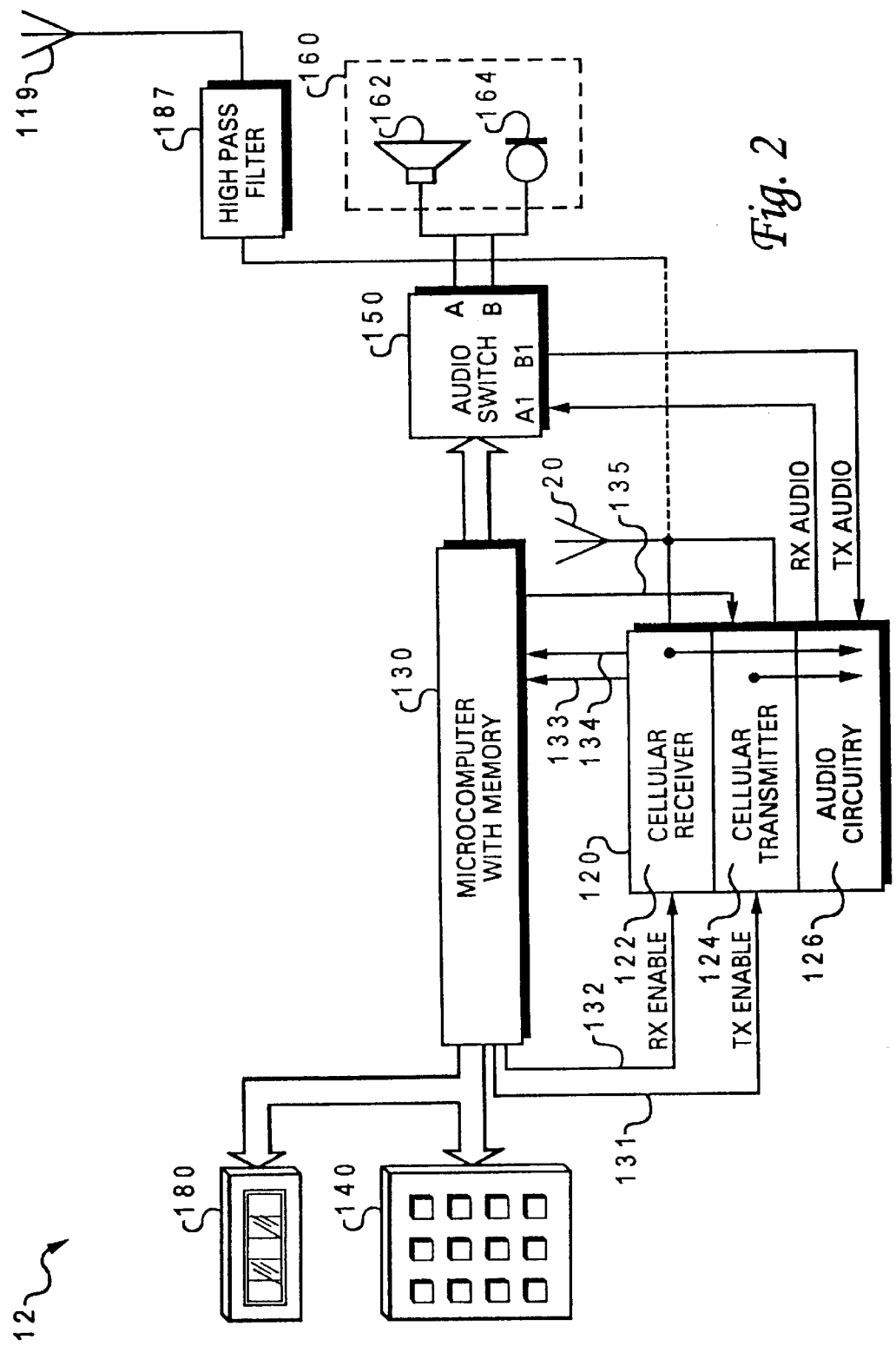
FIG. 2 depicts a block diagram illustrative of a cellular telephone which may be implemented in accordance with a preferred embodiment of the present invention.

FIG. 2 is a block diagram of a cellular telephone 12 which may be implemented in accordance with a preferred embodiment of the present invention. Those skilled in the art will appreciate that although cellular telephone 12 may be utilized in accordance with a preferred embodiment of the present invention, other types of cellular telephone configurations may also be utilized. Cellular telephone 12 includes antenna 20, cellular telephone transceiver 120, microcomputer 130, keypad 140, display 180, audio switch 150, and handset 160, including speaker 162 and microphone 164. Microcomputer 130 is a computer built around a single chip microprocessor. Less powerful than mini-computers and mainframe computers, microcomputer 130 is nevertheless capable of complex tasks involving the processing of logical operations. Microcomputer 130 includes a central processing unit (CPU) (not shown), which is the computational and control unit of microcomputer 130, and which interprets and executes instructions for cellular telephone 12.

Alternatively, cellular telephone transceiver 120 may be coupled to a single antenna 119 in place of antenna 20 and by way of high-pass filter 187, respectively. High-pass filter 187 is utilized to filter only those signals which fall within a frequency range utilized by cellular telephones in the United States. High-pass filter 187 can be further modified to allow for cellular telephone frequency ranges of countries other than the United States. Specific design parameters of such a high-pass filter are left to the discretion of the manufacturer of a cellular telephone such as cellular telephone 12. Display 180 can be any type of display device which visually presents data to a cellular telephone user.

Display devices such as a light-emitting diode panel or liquid crystal display can be utilized to implement display 180. Keypad 140 is a set of keys that are mounted on a small keyboard and are dedicated to a specific purpose, such as inserting numbers. Keypad 140 is preferably modeled on the standard telephone keypad. Control signals 131 TX ENABLE and 132 RX ENABLE of microcomputer 130 enable cellular transmitter 124 and cellular receiver 122, respectively which are coupled to audio circuitry 126. In addition to control signals 131 and 132 to cellular transceiver 120, microcomputer 130 also monitors control signals 133 RSSI, 134, RX DATA, and 135 TX DATA for detecting signal strength, for detecting receive data and for sending transmit data, respectively, utilized in operation of cellular transceiver 120.

Figure 3:
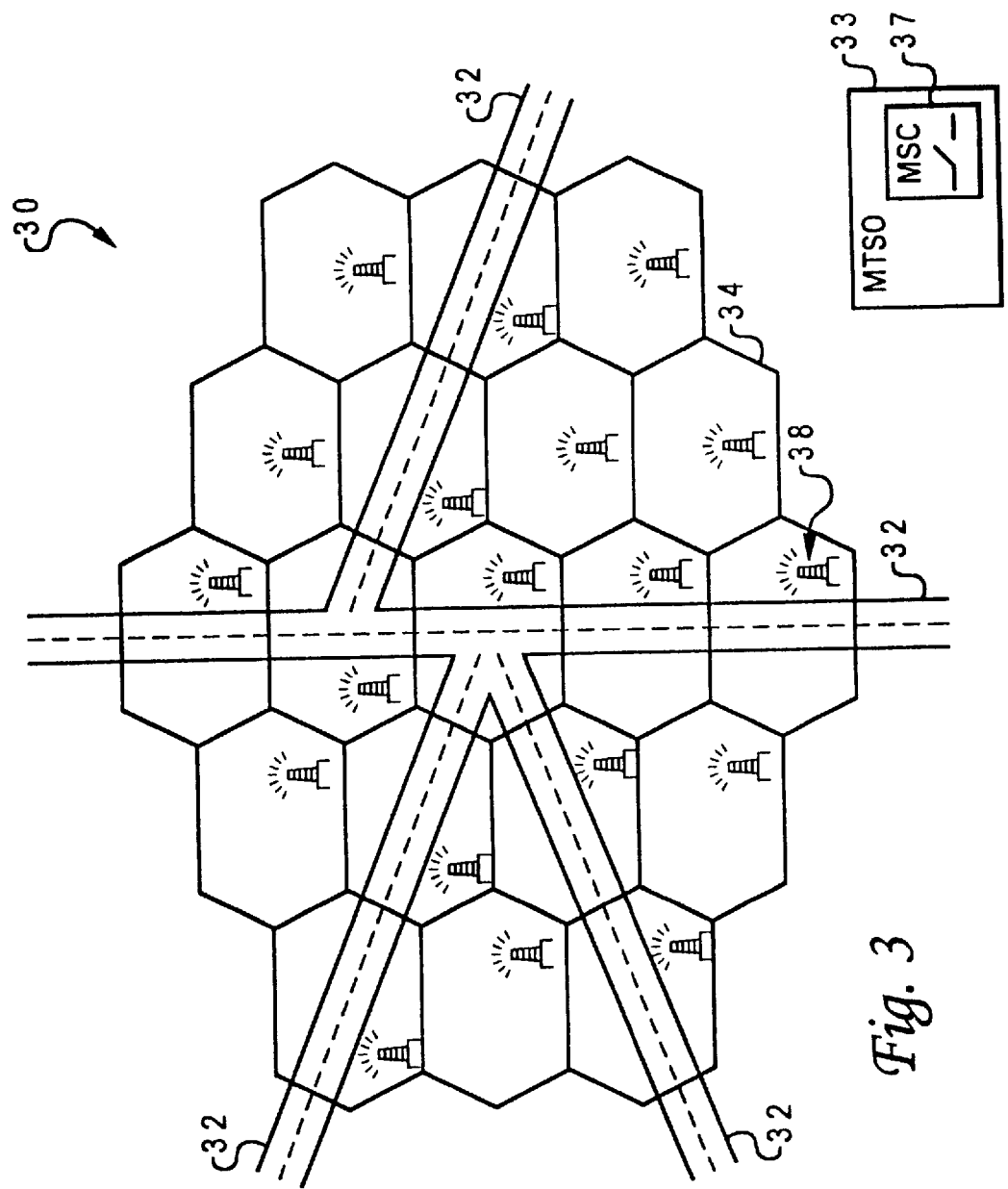
FIG. 3 illustrates a pictorial representation illustrative of a cellular telephone system in which a preferred embodiment of the present invention may be implemented.

FIG. 3 depicts a pictorial representation illustrative of a cellular telephone system 30 in which a preferred embodiment of the present invention can be implemented. Cellular telephone system 30 is analogous to cellular telephone system 10 depicted in FIG. 1, and may incorporate utilization of communications devices such as cellular telephone 12 depicted in FIG. 2. Cellular telephone system 30 is composed of a variety of cells 34. Each cell encompasses a specified geographic area. Each geographic area has its own base station 38 and a single controller (not shown) interconnected with a public telephone network. Each cell 34 sits adjacent another cell to create a honeycomb pattern of cells. Cells 34 can cover a large metropolitan area. Each cell 34 can have a radius of about 13 to 19 km (8 to 12 miles), depending upon the strength of each base station 38.

Specific cell radii are not necessary features of the present invention. Cells can have ranges as low as several hundred feet up to approximately 25 miles in radius. The specific numbers described herein are for demonstrative purposes only and are not necessary features of the present invention. Although not depicted in FIG. 3, each cell 34 can be further subdivided into still smaller cells. In this way, the honeycomb pattern of cells 34 can repeatedly utilize the same range of radio frequencies without interfering with one another, so long as neighboring cells 34 do not utilize precisely the same radio channels.

Although not shown in FIG. 3, each cell 34 can include six directional antennas, centrally located in each cell 34, each radiating into a sixty degree section of each cell. A plurality of cells 34 are combined to form cellular telephone system 30 covering a particular geographic area. This cellular system enables mobile cellular telephone traffic to communicate with landline telephone networks and other mobile cellular telephones while moving through the geographic area. Each cell 34 also has a number of frequencies, transmitted by low power transmitters, assigned to it that cannot be utilized in adjacent cells because of frequency interference problems. Due to the low power of each cell's transmitter, however, the same frequency can be re-utilized in other cells, referred to as co-channel cells in the same metropolitan area.

Cellular telephone system 30 is an example of a cellular mobile service, a communications service that allows a user to access the public telephone network from a stationary or moving vehicle, and which is based on a combination of radio transmission and telephone switching. Individuals with small mobile telephones can utilize this system in the same way that telephone calls are made utilizing standard carriers. The cellular mobile service thus provides a communication link to the user by segmenting a large geographic area into smaller areas (i.e., cells).

Cellular telephone system 30 can include cellular subscriber units which may be mobile or portable. Each base station 38 is connected to the public telephone company (i.e., TELCO) via one or more cellular switching networks (not shown). Each cellular subscriber has an assigned cellular telephone number that allows the user to place and receive calls within a widespread range of each base station 38, such as throughout a metropolitan area. During a cellular telephone call, when a mobile cellular telephone moves from one cell to another, it must be handed-off to the next cell in order to continue communicating. This procedure is accomplished as follows for the analog cellular system. The cell serving the mobile cellular telephone and neighboring cell sites scans (i.e. takes samples of) the received mobile cellular telephone signal strength. This information is collected at a switch and a decision is made whether to hand-off the mobile cellular telephone call to a neighboring cell.

For the U.S. Digital Cellular System, as outlined in the Electronic Industries Association/Telecommunications Industry Association (EIA/TIA) Standard IS-54 document, the mobile cellular telephone also collects channel quality information (channel bit error rate (BER) and signal strength) on its own channel and signal strength measurements on neighboring cell channels. This information is transmitted to the serving cell site as a mobile assisted hand-off (MAHO) message to be added to the base scan information for making a hand-off decision. Such hand-off procedures can be utilized with the cellular telephone system described herein; however, such hand-off procedures are not necessary features of the present invention only and are merely included to describe one particular embodiment of the present invention.

A street or road 32, such as a metropolitan highway, is depicted as extending through cells 34 contained within cellular telephone system 30. Thus, a user can travel along road 32 through cells 34 and while travelling, perform cellular mobile telephone operations. Cellular telephone system 30 further includes a mobile telephone switching office (MTSO) 33, a central office for mobile switching in cellular telephone system 30. MTSO 33 houses a mobile switching center (MSC) 37, and fielded monitoring and relay stations (not shown) for switching calls from cell sites to wire line central offices such as (TELCO) 14 depicted in FIG. 1, or a public switched telephone network (PSTN), made up of local networks, exchange area networks, and long-haul networks that interconnect telephones and other communication devices on a worldwide basis. MSC 37 can control system operations in analog cellular networks. For example, MSC 37 can control calls, track billing information, and locate cellular subscribers. MSC 37 is a switch that provides services and coordination between mobile cellular telephone users in a network such as cellular telephone system 30 and external networks.

Wireless Intelligent Networking (WIN) evolves existing IS41 based networks by introducing new network elements for Intelligent Network services. WIN provides an architecture that facilitates seamless communication services across wireline and wireless networks. Within a Wireless Intelligent Network, particular phrases and terminology are utilized to describe particular WIN elements. Thus, a Wireless Intelligent Network includes Advanced Intelligent Networks (AIN). AIN is a conceptual model of a network in which service functionality is distributed among the various components of the network. Utilizing well-defined interfaces, various distributed functional entities communicate with each other to provide advanced services to an end user. These services are termed "intelligent" because they often make use of subscriber information, current date and time, network resources, and other tools to provide sophisticated service which are designed to be customizable by the service provider and/or the end user.

Various WIN network entities exist within the WIN system. These include an Intelligent Peripheral (IP), a Service Control Point (SCP), and Service Node (SN). An Intelligent Peripheral (IP) is a network entity defined by WIN. An IP provides connection-oriented services through a Public Switched Telephone Network (PSTN). The IP may perform functions such as digit collection, speech recognition, or announcements. The IP may or may not form part of the Service Node (SN). The Service Control Point (SCP) is a real-time database and transaction processor which is capable of receiving/launching queries from/to the MSC to perform real-time customer or application service logic. The SCP may also perform the function of the HLR. The SCP can be a stand-alone entity or a form of an HLR or Service Node (SN). The acronym "HLR" represents the term "Home Location Register," which is a defined network entity. The HLR is a database of local subscriber data, including provisioning, service, and location information. In WIN, the HLR also owns the set of triggers for each subscriber. The HLR may or may not be located within an MSC. The HLR may serve one or more MSCs. The term Services Platform (SP) is utilized to define the Service Control Point (SCP) and Service Node (SN). The Service Node (SN) itself is simply the combination of a Service Control Point (SCP) and an Intelligent Peripheral (IP).

The WIN system also includes functional entities. One such functional entity is a Service Control Function (SCF) which commands call control functions in the processing of WIN provided and custom service requests. The SCF can interact with other functional entities to access additional logic or to obtain information (i.e., service or user data) required to process a call and service logic instance. This entity usually resides in the Service Control Point (SCP). Another functional entity within the WIN system is the Call Control Function (CCF). The Call Control Function (CCF) provides call and service processing and control. This entity usually resides in the MSC. Still, an additional functional entity within the WIN system is the Service Switching Function (SSF), which is associated with the Call Control Function (CCF) and provides a set of functions required to the interaction between the CCF and a Service Control Function (SCF). This entity usually resides in the MSC.

Figure 5:
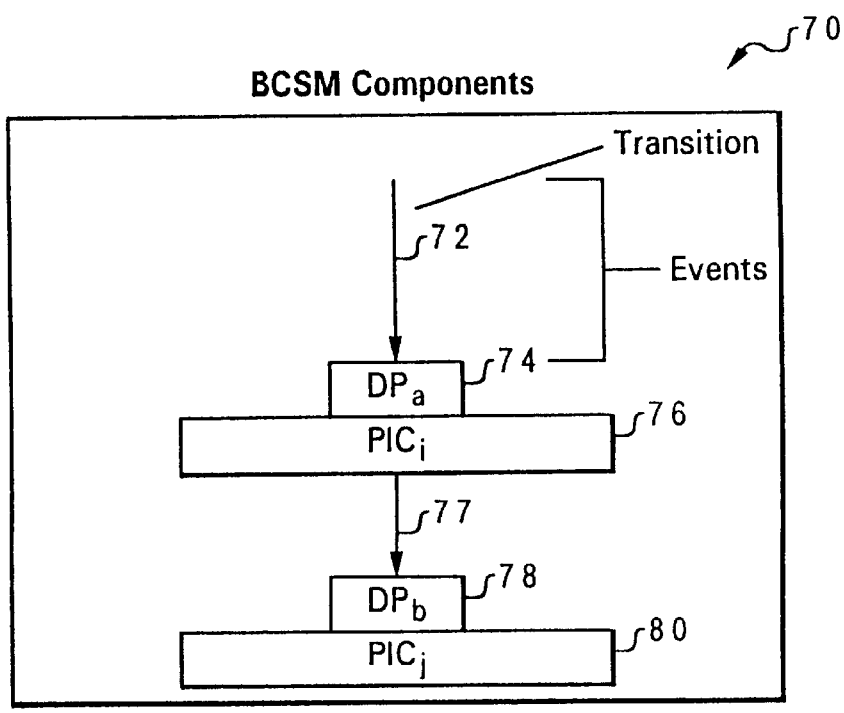
FIG. 5 illustrates a block diagram illustrative of components of a Basic Call State Model (BCSM), in accordance with a preferred embodiment of the present invention.

WIN makes use of a Basic Call State Model (BCSM) which includes the following components: Points in Call (PIC), Points in Mobility Management (PIMM), Detection Points (DPs) and Trigger Detection Points (TDPs). The Basic Call State Model (BCSM) is a high-level model of the call processing activities within the MSC. An example of a BCSM is illustrated in FIG. 5 herein. The BCSM defines the Points in Calls (PICs), Detection Points (DPs), and the transitions between various call states. Such a model allows for consistent implementation of triggers among different vendors. In the half-call model outlined by the WIN baseline, the BCSM defines each stage encountered during call processing. WIN defines two BCSMs: an Originating Basic Call State Model (O-BCSM), and a Terminating Basic Call State Model (T-BCSM).

The term HLR has already been defined herein. The acronym VLR represents the term "Visiting Location Register," which is a defined network entity. The VLR is the location register other than the HLR which is utilized by an MSC to retrieve information for handling calls to or from a visiting subscriber. The VLR is often indistinguishable from an MSC. In WIN, the VLR is also responsible for maintaining a copy of the active triggers for each visiting subscriber. Often this involves the sending of a standard query to another node such as an HLR or Service Control Point (SCP).

A Point In Call (PIC) is a part of a Basic Call State Model (BCSM). PICs identify call processing activities required to complete one or more basic call and connection functions of interest to WIN service logic instances. An example of a PIC is Analyze_information in the O-BCSM which is responsible for translating dialed digits. Refer specifically to the block labelled Analyze_Information in FIG. 6 herein (i.e., block 200 of FIG. 6).

A Detection Point (DP) is a point in basic call and connection processing at which a transfer of control can occur. The transfer of control in a wireless network is usually utilized by the sending of an IS41 query to a network entity such as an HLR, SCP or Service Node (SN). At a supported DP, it is possible to transition to a Point In Call (PIC) as required by the WIN call model outlined herein. This transition is based on the parameters received in a WIN Query Return Results after a trigger has been detected (and a WIN Query Launched). A DP may be armed as one or both of the following for the same call: TDP (Trigger Detection Point), and EDP (Event Detection Point) Detection Points are processed in the following order listed from highest to lowest priority:

EDP-N (EDP-Notification)

TDP-N (TDP-Notification)

EDP-R (EDP-Request)

TDP-R (TDP-Request)

A Trigger Detection Point is a specific point in the process of a call in which triggers may be armed and control may be transferred to an off-board platform such an SCP or a Service Node (SN). At any Detection Point, only one trigger is acted on at a time, even if multiple triggers are detected at a Detection Point. Processing of notification type TDPs (TDP-N) has higher priority than processing of request type TDPs (TDP-R).

FIG. 4 depicts a table 40 illustrating Wireless Intelligent Networking (WIN) trigger attributes, in accordance with a preferred embodiment of the present invention. A WIN Trigger (also referred to simply as a "trigger") is a defined condition which exists within one or more Detection Points (DPs). A trigger is typically armed by parameters received within a subscriber profile. Once armed, the trigger's criteria are checked at a particular point within call processing. If the criteria are met, an IS41 WIN message is sent to a predefined address (HLR, SCP, IP or SN). At this point, call processing may be suspended until a response or a special directive message is received. A WIN Trigger possesses various attributes used by Call Processing. Some of these attributes are depicted in the FIG. 4. The attributes are specifically listed under the Attribute 42 column of FIG. 4. Their associated descriptions are given under the Description 44 column. Attributes listed within FIG. 4 include TDP 46, which is a Trigger Detection Point at which the trigger can be detected. Another attribute depicted in FIG. 4 is a Category 48, which is described as including several categories, including Subscribed Triggers for a specific subscriber, contained within the subscriber's HLR profile; Group Triggers for a group of subscribers; and Office Triggers for all subscribers roaming within the MSC. Interface 50 is another trigger attribute. "Interface" refers to a type of interface to which data can be assigned (e.g., inter-office trunk, mobile origination, mobile termination).

An additional trigger attribute is Precedence 52. "Precedence" refers to an order of arming for a specific trigger when originated by more than one service. For example, subscribed triggers have precedence over group triggers, and group triggers have precedence over office triggers. Priority 54, DP Criteria 56, WIN Query Message 58, Arming Mechanism 60 and Fault Handling 62 are additional trigger attributes. The term "priority" refers to an order of detection criteria evaluation among triggers at a specific DP. The phrase "DP Criteria" refers to the condition which must be met for a trigger to be detected. WIN Query Message is a message to be sent when the trigger is detected, while an Arming Mechanism identifies the mechanisms by which the trigger is armed. Fault Handling defines fault handling procedures for the case when the SCF does not respond to the SSF/CCF message.

A Feature Interaction Manager (FIM) is a logical entity in the MSC that provides mechanisms to support multiple current instances of WIN service logic and non-WIN service logic on a single call. The Feature Interaction Manager (FIM) arbitrates between WIN and non-WIN features to determine precedence ordering. There is one Feature Interaction Manager (FIM) per Detection Point (DP). A Service Interaction Manager (SIM) is a logical entity which provides arbitration among various services in the SCP or Service Node. If multiple services may react to a given WIN query, it must prioritize among them.

FIG. 5 illustrates a block diagram 70 illustrative of components of a Basic Call State Model (BCSM), in accordance with a preferred embodiment of the present invention. FIG. 1 depicts components that have thus far been identified to describe a BCSM. PICs (i.e. Points In Calls), Detection Points (DPs), transitions, and events are depicted within FIG. 5. Arrows 72 and 77 represent event transitions. PICs identify activities required to complete one or more basic call and connection states of interest to WIN service logic instances. DPs indicate points in basic call and connection processing at which transfer of control can occur. Transitions indicate the normal flow of basic call and connection processing from one PIC to another. Events cause transitions into and out of PICs. A first Detection Point is referenced in FIG. 5 as $DP_a$ 74, located adjacent $PIC_i$ 76. A second Detection Point is referenced in FIG. 5 as $DP_b$ 78 and is located adjacent $PIC_j$ 80.

Figure 6:
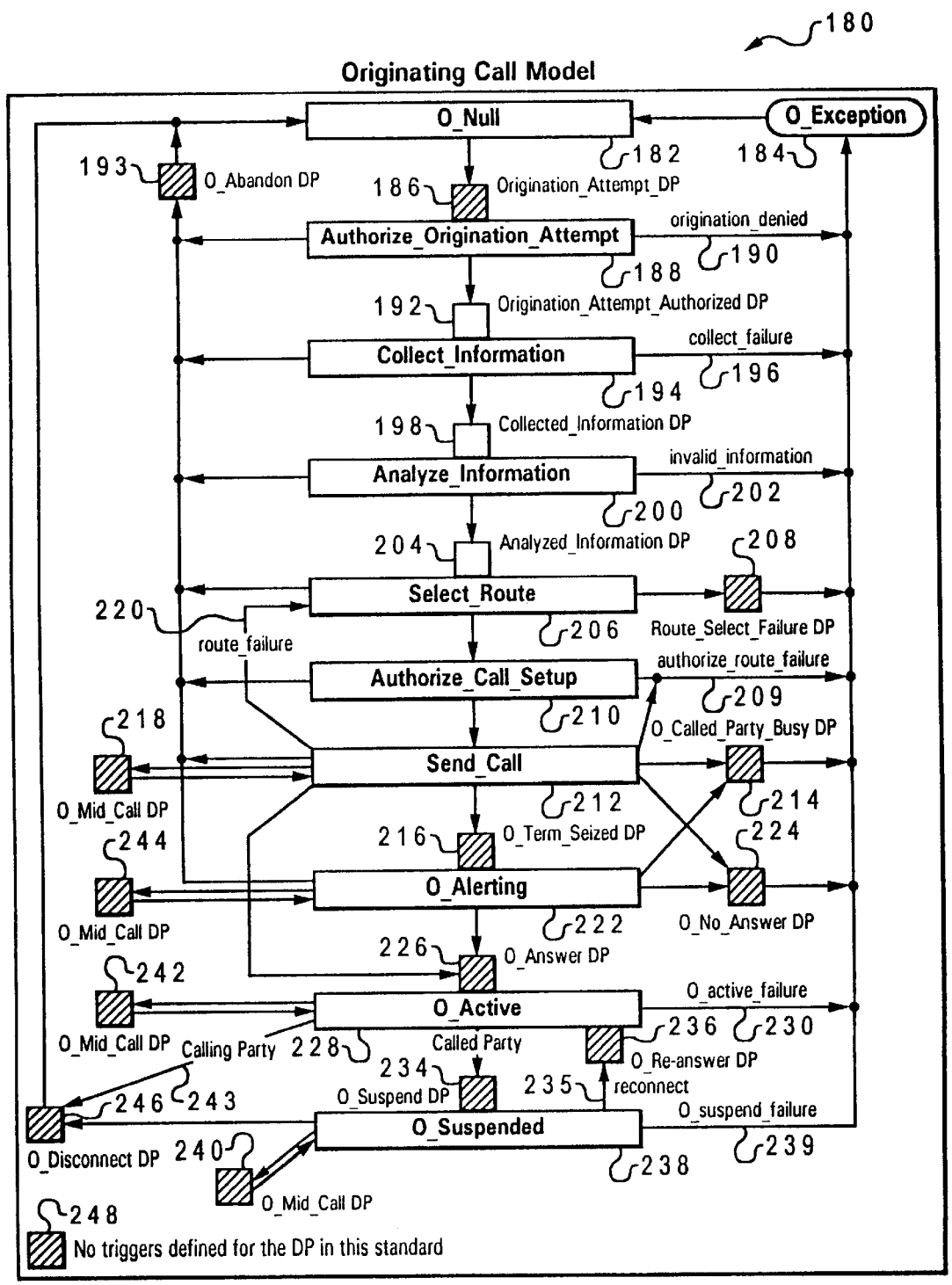
FIG. 6 depicts a flow chart of operations for an originating call model, in accordance with a preferred embodiment of the present invention.
Figure 7:
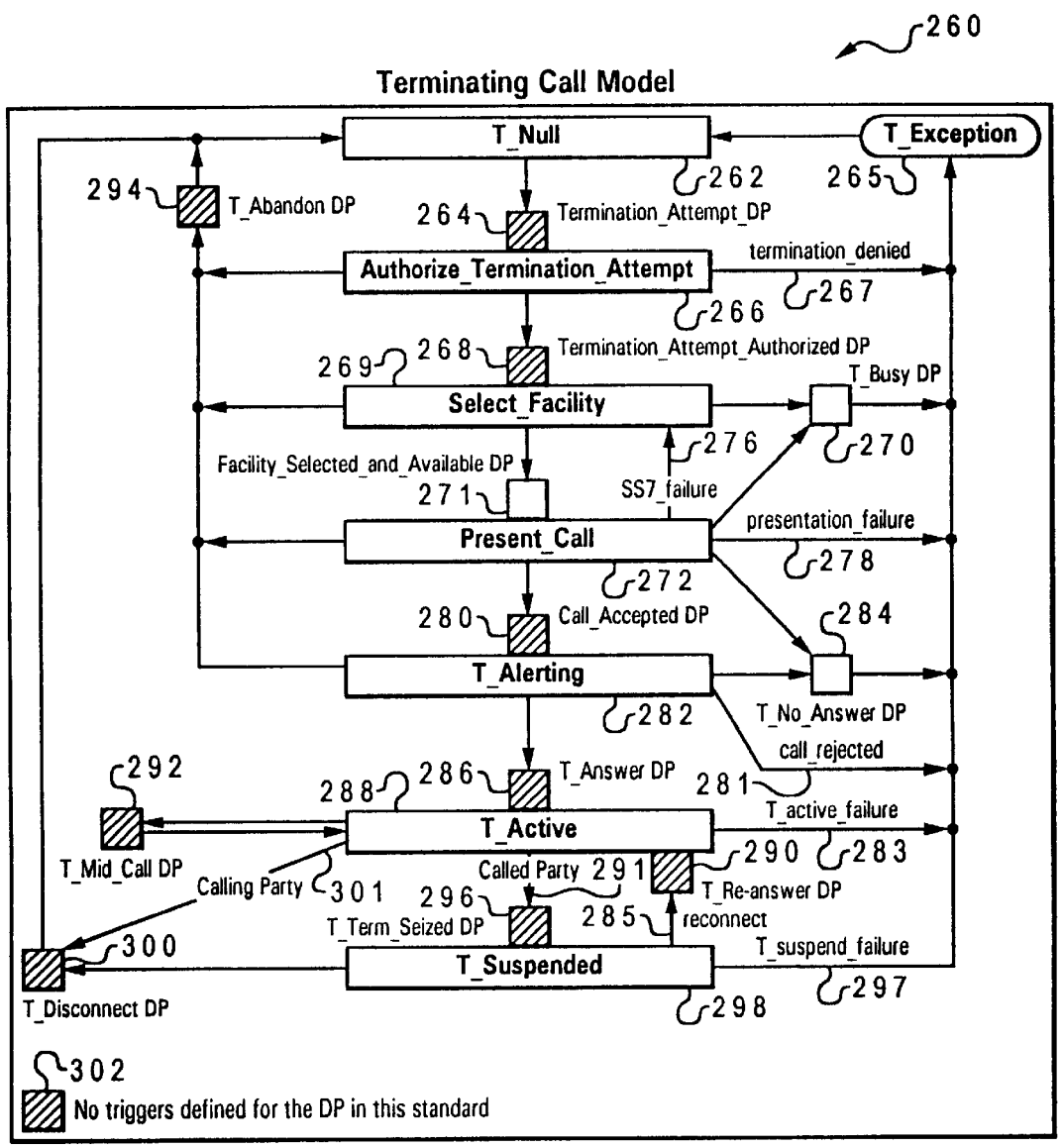
FIG. 7 illustrates a flow chart of operations for a terminating call model, in accordance with a preferred embodiment of the present invention.

FIG. 6 depicts a flow chart of operations 180 for an originating call model, in accordance with a preferred embodiment of the present invention. FIG. 7 illustrates a flow chart of operations 260 for a terminating call model, in accordance with a preferred embodiment of the present invention. It can be appreciated by those skilled in the art that FIG. 6 and FIG. 7 herein present a self-consistent sequence of steps leading to a desired result. The steps are those requiring physical manipulation of physical quantities. Usually, although net necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

The present invention relates to method steps for processing electrical or other (e.g. mechanical, chemical) physical signals to generate other desired physical signals, and can be implemented via a computer such as microcomputer 130. However, it is not necessary to maintain within a computer memory of a cellular telephone, instructions implementing these method steps. Such instructions can be maintained with a computer memory at a cellular telephone base station or a central broadcasting center from which such base stations receive instructions. Implementation of the method described herein is left to the discretion of a particular cellular telephone system designer.

It can be appreciated by one skilled in the art that the methods or processes described herein can be implemented as a program product, such as a control program residing with a computer memory and containing instructions that when executed on a CPU, will carry out the operations depicted in the logic flow charts described herein. It is important to note that, while the present invention can be described in the context of a fully functional computer system, those skilled in the art can appreciate that the present invention is capable of being distributed as a program product in a variety of forms, and that the present invention applies equally, regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Preferred implementations of the invention can include implementations to execute the method or methods described herein as a program product residing in a memory of microcomputer 130, as depicted at FIG. 2. Alternatively, a preferred embodiment of the present invention can include a program product residing in a microcomputer memory located at an MSC (i.e., "MSC" is an acronym for "mobile switching center"). An MSC typically controls system operations in cellular networks. For example, an MSC can control calls, track billing information, and locate cellular subscribers. The program product thus includes sets of instructions for executing the method and systems described herein. Until required by the microcomputer, the set of instructions may be stored as a computer-program product in another computer memory, for example, in a disk drive attached to the microcomputer (which may include a removable memory such as an optical disk or floppy disk for eventual use in the disk drive).

Further, the computer-program product can also be stored at another computer and transmitted when desired to the user's workstation by a network or by an external network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Note that the invention describes terms such as "associating," "transferring," "establishing," or other such terms that could be associated with a human operator. However, for at least a number of the operations described herein which form part of at least one of the embodiments, no action by a human operator is desirable. As indicated herein, these operations described are, in large part, machine operations processing electrical signals to generate other electrical signals. Thus, a method for implementing the steps depicted in FIG. 6 and FIG. 7 can be accomplished with a computer-aided device.

Thus, FIG. 6 illustrates the WIN DPs and PICs within the Originating Call Model. As depicted at block 182, an O_Null operation occurs. As illustrated at block 186, an Origination_Attempt_DP operation is initiated. The origination attempt the proceeds to an Authorize_Origination_Attempt PIC, as depicted at block 188. If the origination attempt is denied, then as illustrated at arrow 190, an O_Exception operation is processed at block 184 followed by the reprocessing of the null operation depicted at block 182. The operations described in FIG. 6 are utilized to process triggers within a call, specifically triggers within an Originating Call Model. Thus, the triggers may be abandoned as indicated at block 193. However, if the origination attempt is not denied and is not abandoned, the triggers then proceed for processing at an Origination_Attempt Authorized DP, as described at block 192. The triggers are thereafter processed at a Collect_Information PIC, as illustrated at block 194. If a collect_failure results, as described at block 196, the O_Exception operation depicted at block 184 is processed. However, if a collect_failure does not result or the triggers are not abandoned, as depicted at block 193, the triggers are processed at a Collected_Information DP, as depicted at block 198. Following processing of the triggers at the Collected_Information DP, as illustrated at block 198, the triggers are processed at the Analyze_Information PIC 200.

If invalid_information results, as indicated at arrow 202, then the O_Exception operation processes the triggers, as depicted at block 184. However, if valid information results, then the triggers are processed at the Analyze_Information DP depicted at block 204. Following processing of the triggers at the Analyze_Information DP, the triggers are processed at a Select_Route PIC, as indicated at block 206. If a Route_Select_Failure DP results, as indicated at block 208, then the triggers are processed at the O_Exception operation, as depicted at block 184. If the triggers are abandoned, the triggers are processed at the O_Abandon DP operation described at block 193. However, if the triggers are neither abandoned nor failed, the triggers are processed at an Authorize_Call_Setup PIC, as illustrated at block 210. If an authorize_route_failure results as indicated at arrow 209, the operation described at block 184 is subsequently processed. Assuming no abandonment or failure of the triggers at this point, the triggers are sent to a Send_Call PIC for processing, as depicted at block 212. Several possible operations may be performed at this point.

An authorize_route_failure, as indicated at arrow 209, may occur. The triggers may be forwarded to an O_Called Party Busy DP, as indicated at block 214, or an O_No_Answer DP as illustrated at block 224. If the triggers are abandoned, then the abandonment operation depicted at block 193 processes the triggers. Alternatively, the triggers may be processed at an O_Mid_Call DP, as depicted at block 218 which in turn returns triggers for processing at the Send_Call PIC. If a route_failure occurs as illustrated at arrow 220, the triggers are thereafter processed at the Select_Route PIC operation depicted at block 206. In addition, the triggers may be transferred to an O_Answer DP, as indicated at block 226. Following implementation of Send_Call, as illustrated at block 212, the triggers proceed to an O_Term_Seized DP, as indicated at block 216. The triggers are subsequently processed at an O_Alerting PIC, as depicted at block 222. Several optional operations may occur at this point in the Originating Call Model of FIG. 6. The triggers may proceed for processing at the O_No_Answer DP as indicated at block 224, or the triggers may be processed at the O_Called_Party_Busy DP as depicted at block 214.

The triggers may be abandoned, as indicated at block 193, or they may be also be sent to an O_Mid Call DP, as illustrated at block 244. Triggers from the O_Mid Call DP may also be returned to the O_Alerting PIC. Following processing of the triggers at the O_Alerting operation, as indicated at block 222, the triggers are processed at the O_Answer DP, as illustrated at block 226. Following processing at the O_Answer DP, the triggers are processed at an O_Active PIC, as indicated at block 228. If an O_active_failure results, as depicted at arrow 230, the triggers are processed at the O_Exception operation depicted at block 184. Following processing of the triggers at the O_Active PIC, as described at block 228, the triggers may be sent to an O_Mid_Call DP, as illustrated at block 242 or via a Calling Party (i.e., see arrow 243) to an O_Disconnect DP, as illustrated at block 246. Following disconnection, as illustrated at block 246, the null operation depicted at block 182 is repeated.

Following successful completion of the operation depicted at block 228, the triggers are processed at an O_suspend DP, as illustrated at block 234. The triggers then proceed to an O_Suspended PIC, as illustrated at block 238. An O_suspend failure may result, as indicated at block 239, in which the O_Exception operation depicted at block 184 is processed. A reconnect operation may also result, as illustrated at arrow 235. Following the reconnect operation, the triggers are sent to an O_Re-answer DP, as illustrated at block 236, following by a re-processing of the O_Active PIC, as indicated at block 228. The triggers may also be transferred to and from an O_Mid Call DP, as illustrated at block 240. As indicated at block 248, a shaded block indicates that no triggers are defined for the DP in the WIN configuration described herein.

FIG. 7 illustrates the WIN DPs and PICs within a Terminating Call Model. As illustrated at block 262, a null operation (i.e., T_Null) occurs. As depicted at block 264, the triggers are forwarded to a Termination_Attempt_DP, and then as described at block 266, the triggers are processed at an Authorize_Termination_Attempt PIC. If the termination attempt is denied, as illustrated as termination_denied at arrow 267, the triggers undergo "exception" processing, as depicted at T_Exception at block 265. If the triggers are to be abandoned, the triggers are routed for abandonment processing at a T_Abandon DP, as described at block 294. Assuming the triggers are neither abandoned nor terminated, the triggers are processed at a Termination_Attempt_Authorization DP, as illustrated at block 268. The triggers are thereafter processed at a Select_Facility PIC, as indicated at block 269. If the triggers encounters a busy signal, as described as T_Busy DP at block 270, the triggers are processed at T_Exception, as depicted at block 265. If the triggers are abandoned, the triggers are processed at T_Abandon DP, as illustrated at block 294.

If the triggers are neither abandoned nor busy, the triggers are processed at a Facility_Selected_and Available DP, as depicted at block 271. The triggers are subsequently processed at a Present_Call PIC. Several options are available at this point in the Terminating Call Model depicted in FIG. 7. The triggers may encounter a busy signal via a T_Busy DP, as depicted at block 270, or the triggers may undergo a presentation_failure, as depicted at arrow 278. The triggers may also encounter a T_No_Answer DP, as illustrated at block 284. In addition, the triggers may encounter a failure, as indicated as SS7_failure as depicted at arrow 276. In either of these four cases, the triggers are subsequently processed at T_Exception, as indicated at block 265. The triggers may also be abandoned, as indicated at the T_Abandon DP described at block 294. Following successful processing of the triggers at the Present_Call PIC, as indicated at block 272, the triggers proceed to a Call_Accepted DP for processing, as illustrated at block 280. The triggers are subsequently processed at a T_Alerting PIC, as depicted at block 282.

The triggers may be rejected, as indicated by call_rejected at arrow 281, or the triggers may encounter no answer, as indicated by the T_No_Answer DP described at block 284. The triggers may also be abandoned, as described at the T_Abandon DP illustrated at block 294. After processing at the T_Alerting PIC depicted at block 282, the triggers are processed at a T_Answer DP, as illustrated at block 286. Following successful processing at T_Answer DP, as illustrated at block 286, the triggers are processed at a T_Active PIC, as indicated at block 288. The triggers may encounter a failure, as indicated by T_active_failure, as described at arrow 283. The triggers may also be routed to a T_Mid_Call DP, as indicated at block 292. Triggers may be subsequently returned from the T_Mid_Call DP for processing at the T_Active PIC.

The Calling Party, as indicated at arrow 301 may be disconnected, such that the triggers are disconnected, as described at T_Disconnect DP illustrated at block 300. Following successful completion of trigger processing at T_Active, as indicated at block 288, the Called Party is contacted as indicated at arrow 291. The triggers are subsequently processed at a T_Term Seized DP, as described at block 296. After the triggers are processed at the T_Term Seized DP, the call proceeds to a T_Suspended PIC, as described at block 298. The call may be reconnected via reconnect, as indicated at arrow 285, in which case the triggers are subsequently processed at a T_Re-answer DP, as illustrated at block 290. The call may also encounter a failure, as depicted by a T_suspend_failure indicated at arrow 297. The call may also be disconnected by processing the triggers at the T_Disconnect DP, as described at block 300. Block 302 indicates a shading scheme for the Terminating Call Model wherein no triggers are defined for the DP in the configuration depicted in FIG. 7.

Figure 8:
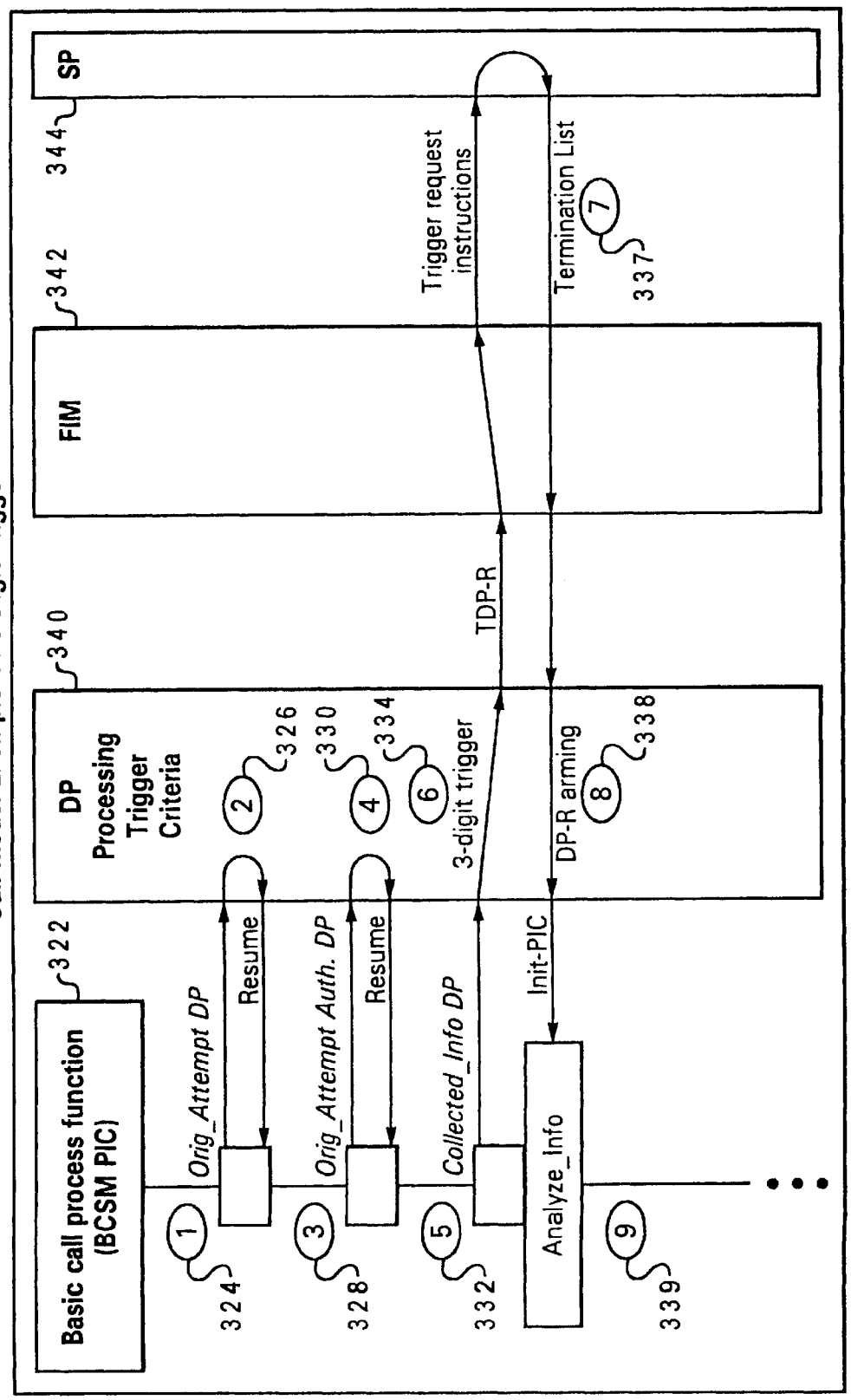
FIG. 8 depicts a block diagram illustrative of a call model example of a three-digit trigger, in accordance with a preferred embodiment of the present invention.

FIG. 8 depicts a block diagram 320 illustrative of a call model example of a three-digit trigger, in accordance with a preferred embodiment of the present invention. Block diagram 320 illustrates the flow of a three-digit trigger which has been armed through the Originating Call Model depicted in FIG. 6. Within the call model example of a three-digit trigger, as illustrated block diagram 320 of FIG. 8, is a block 340 representative of Detection Point (DP) Processing Criteria. Block 322 represents a basic call process function (i.e., a BCSM PIC). Block 342 is representative of a Feature Interaction Manager (FIM), which is an entity in the MSC that provides mechanisms to support concurrent instances of WIN service logic and non-WIN service logic on a single call. The FIM arbitrates between WIN and non-WIN features to determine precedence ordering. In addition, block 344 represents a Service Platform (SP).

Thus, as indicated at first step 324, the Orig_Attempt DP is processed. Next, as illustrated at second step 326, no trigger criteria is met at this DP, so processing resumes. Thereafter, as depicted at third step 328, the Orig_Attempt_Auth DP is processed. As described at fourth step 330, no trigger criteria is met at this DP, and thus processing resumes. As subsequently described at fifth step 332, the Collected_Info DP is processed. Thereafter, as indicated at sixth step 334, the three-digit dialing criteria are detected. The FIM requests trigger instructions from the SP. As depicted at seventh step 337, the SP converts the three-digits to a ten-digit number. The SP sends the Termination List so that the call can be terminated to the new party. Then, as indicated at eighth step 338, the termination list is processed. Thereafter, as described at ninth step 339, after the trigger is processed, the call proceeds to an Analyze_Info PIC.

Figure 9:
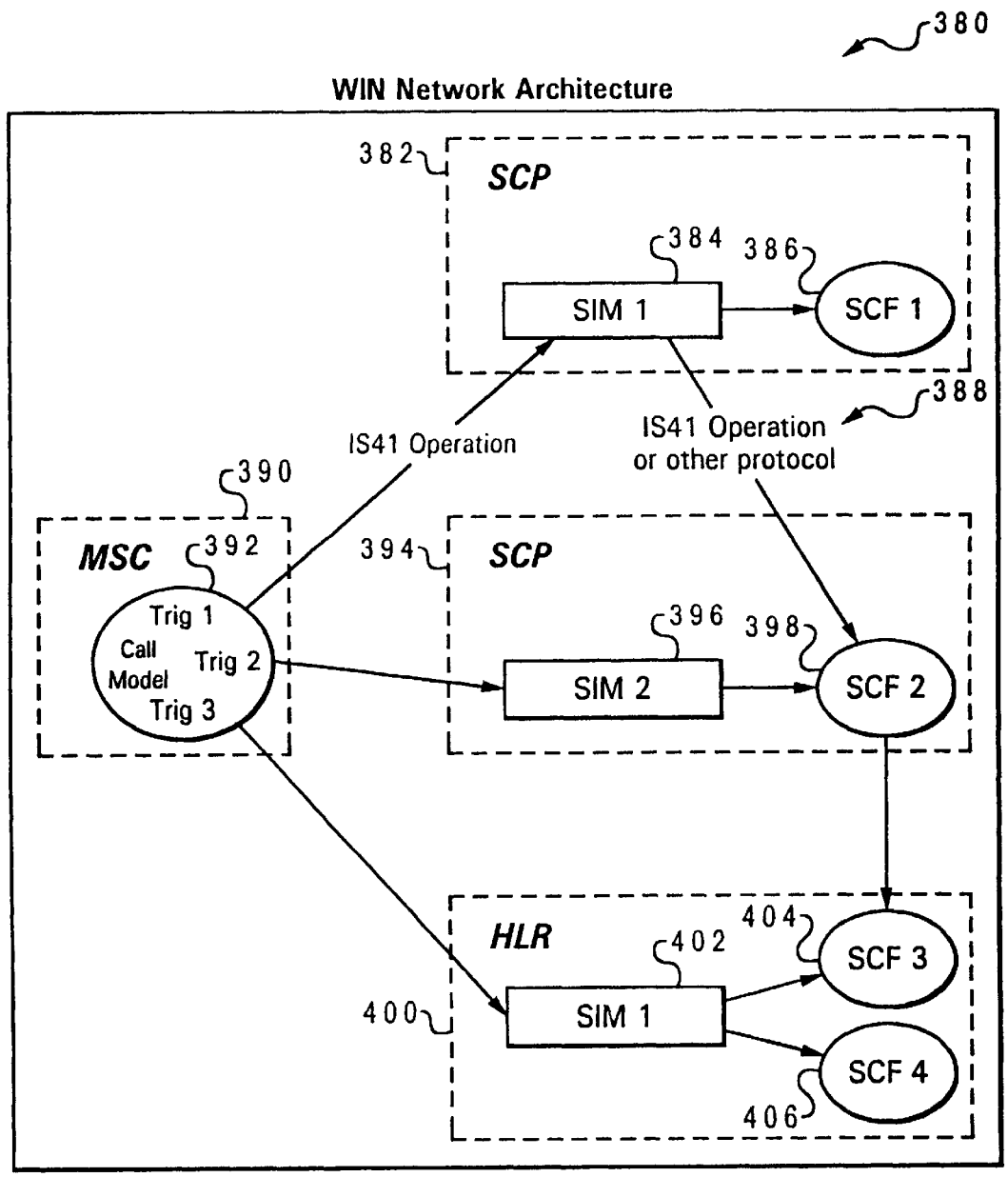
FIG. 9 illustrates a block diagram illustrative of Wireless Intelligent Networking (WIN) network architecture, in accordance with a preferred embodiment of the present invention.

FIG. 9 illustrates a block diagram 380 illustrative of Wireless Intelligent Networking (WIN) network architecture, in accordance with a preferred embodiment of the present invention. The WIN network architecture depicted in FIG. 9 includes a first Service Control Point (SCP) 382 and a second Service Control Point (SCP) 394. A Service Control Point (SCP) is a network entity defined by WIN that acts as a real-time database and transaction processor capable of receiving/launching queries to/from the MSC (e.g., MSC 390) in order to perform real-time customer or application service logic. The SCP may also perform the function of the HLR. It may be a stand-alone entity or part of an HLR or Service Node (SN). Included within block diagram 380 is an HLR which may receive instructions from MSC 390 via Call Model 392. Call Model 392 includes three-triggers and is analogous to the three-trigger call model depicted in FIG. 8. Within first SCP 382 is a Service Interaction Manager (SIM) and a Service Control Function (SCF), respectively identified as first SIM 384 and first SCF 386. IS41 operation or other protocol information 388 is transferred from first SIM 384 to second SCF 398 of SCP 394. Data from second SIM 396 of SCP 394 may also be transferred to second SCF 398 which in turn transfers data to third SCF 404. HLR 400 includes a first SIM 402, third SCF 404, and fourth SCF 406.

A preferred embodiment of the present invention, as described herein, may implement a WIN Trigger Environment. The WIN Trigger Environment is designed to reduce the software and development effort required to support triggers, as well as to provide a WIN Capable MSC (Mobile Switching Center) that can be customized to suit the needs of the service provider. The intent of the WIN Trigger Environment is to provide an environment which allows trigger criteria to be specified in a so-called "user friendly" manner, and to create and modify WIN queries. In addition, the WIN Trigger Environment controls triggers at trigger detection points by specifying criteria, precedence, priority, and actions to be performed. The functionality of the WIN Trigger Environment allows a new WIN trigger to be defined and activated in an MSC system. The WIN Trigger Environment includes an trigger definition database function, a trigger criteria expression evaluator, a trigger criteria expression builder, and a "plug & play" WIN query message function. The WIN Trigger Environment promotes a quick turn-around when incorporating new triggers.

Figure 10:
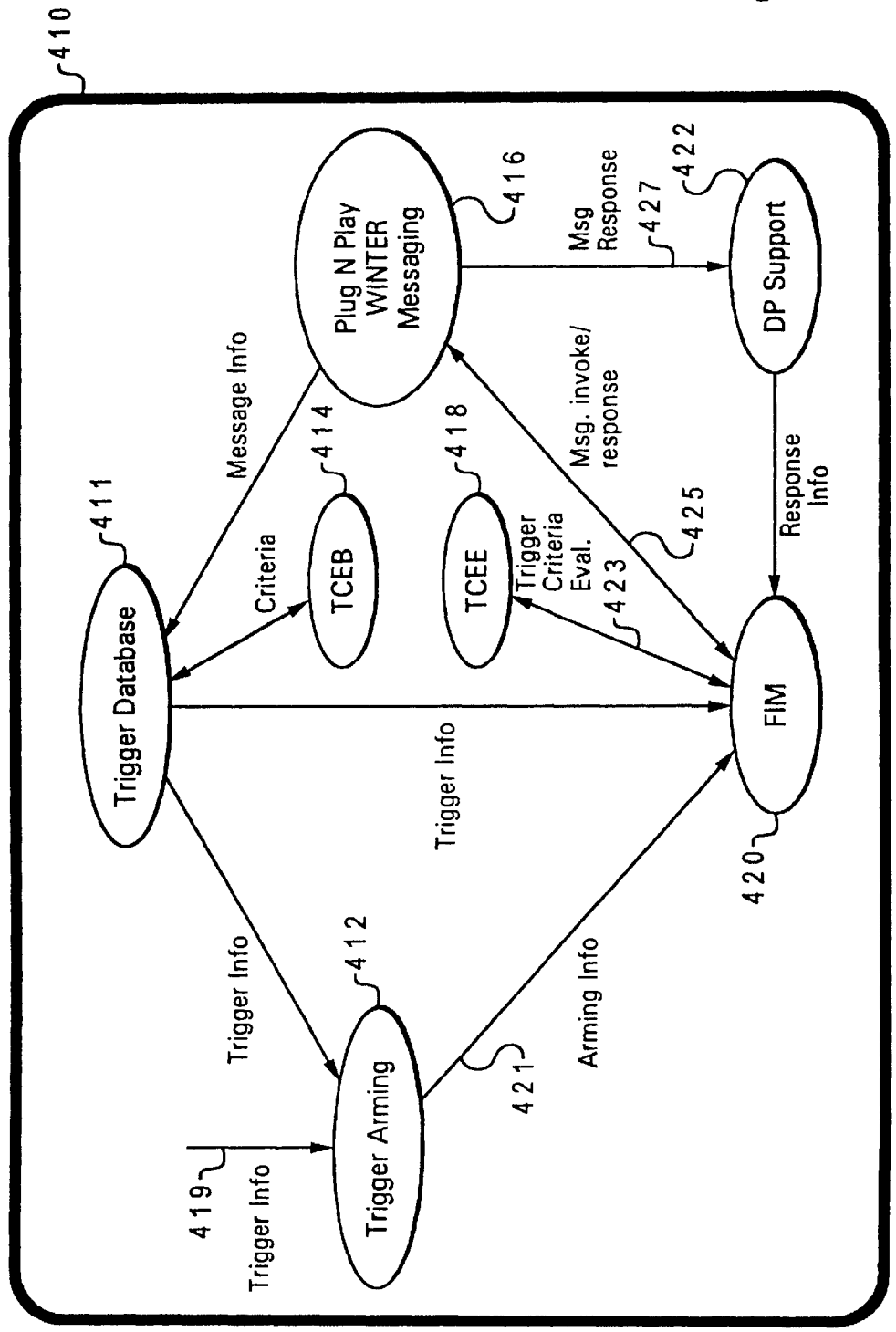
FIG. 10 depicts a block diagram illustrative of a high-level interface among components within a WIN Trigger Environment, in accordance with a preferred embodiment of the present invention.

FIG. 10 depicts a block diagram 410 illustrative of a high-level interface among components within a WIN Trigger Environment, in accordance with a preferred embodiment of the present invention. The WIN Trigger Environment depicted in FIG. 10 includes a trigger database 411 which can be accessed by a Feature Interaction Manager (FIM) 420. Trigger Criteria Expression Builder (TCEB) 414 may also access trigger database 411. TCEB 414 is an expression creation environment which enable triggers to be represented as dynamic operator-entered expressions for inclusion in the WIN Trigger Definition Database (i.e., trigger database 411). This provides the flexibility of quickly developing logic expressions for triggers. TCEB development includes input expression, expression semantics, and an expression interpreting mechanism. A "plug & play" WIN query message function 416 sends message information to trigger database 411.

Trigger information is sent from trigger database 411 to FIM 420. Arming information 421 is sent from the trigger arming functionality 412 to the FIM. Trigger arming functionality 412 is responsive to trigger information, represented by arrow 419 and trigger information provided by trigger database 411. Trigger criteria evaluation data, represented by arrow 423, is sent to Trigger Criteria Expression Evaluator TCEE 418, which analyzes call data in current context. The TCEE yields a "true" or "false" for an evaluated expression and is based on parsing, validation, storage and evaluation techniques. Message invoke/response data, as indicated by arrow 425, is sent to and from "plug & play" WIN query message function 416 to FIM 420. It is possible to create messages with new tags as well as change the tags on parameters. In terms of handling return results, the "plug & play" WIN query message function implements a non-message specific protocol that normalizes all return values at a Trigger Detection Point (TDP). Those skilled in the art will appreciate that this "plug & play" capability is not limited to a specific protocol, such as the standard outlined in the Electronic Industries Association/Telecommunications Industry Association (EIA/TIA) Standard IS-41 document (also referred to sometimes as "ANSI-41"), but may in fact be utilized in association with other protocols.

A block diagram representative of detection point support is depicted in FIG. 10 as DP Support 422, which may receive message response data, as indicated by arrow 427. Trigger database 411 is a database of supported WIN triggers, and includes definitions of standard triggers, and a mechanism for creating custom, proprietary triggers. Trigger database 411 stores trigger definitions, driver trigger arming and may provide Human Machine Interface (HMI). Trigger database 411 comprises an MSC WIN Trigger Definition Database component and is the heart of the trigger environment in the MSC. Trigger database 411 contains the master definitions for the triggers supported on a particular MSC. This component provides the specifying of triggers supported, based on massages and scope of applicability.

The aspects of the trigger definition include the TDP at which it is active, criteria, precedence and WIN query message issued when the trigger is detected. The trigger definition database makes it possible to define/edit these triggers without further software changes. The scope of a trigger may be defined according to one of the following categories: subscribed triggers, group triggers, or office triggers. Subscribed triggers are triggers for a specific subscriber, and are contained within the subscriber's HLR profile. The subscribed triggers may be profile-based per SCP address, profile-based per HLR, or profile-based in general. Group triggers are triggers for a group of subscribers, while office triggers are triggers for all subscribers roaming within the MSC. Office triggers are included in the most general category of the scope of a trigger. Any call that satisfies the DP criteria can encounter the trigger. Office triggers apply to all who are roaming within the MSC.

In office control, the triggers apply to all subscribers on a switch. That is, the triggers are applicable for all calls having a mobile originator. An example of such a configuration is a 3-digit trigger, such as 411. Another example, in the case of a fast-food restaurant, such as Pizza Hut™, is the ability to possess one number for Pizza Hut™ regardless of its location. The number dialed causes the firing of a trigger. A message is then sent to the SCP associated with the Pizza Hut™ application, and determines where the subscriber is located, and route the call to the nearest Pizza Hut™. If a trigger is an office trigger, any call that satisfies the DP criteria can encounter the trigger. This trigger is not downloaded in the subscriber's profile. An SCP-address is associated with each office trigger and utilized to specify which SCP to which messages should be sent. An example of this switch-based/office control, utilizing the same Pizza Hut™ example mentioned above, is trigger criteria based on a common number such a common number for pizza delivery (e.g., *PIZZA). The call is routed to the nearest Pizza Hut™ (i.e., called_number=*PIZZA), and sent to the SCP (i.e., called_number, *trigger, cell site). The SCP replies with the phone number of the closest Pizza Hut™. Of course, thoses killed in the art will appreciate that the scope of a trigger may be defined by other categories not mentioned herein. The examples discussed herein are presented for illustrative purposes only and represent some of the many techniques by which the scope of a trigger may be potentially defined.

The trigger definition database (TDB), which is analogous to trigger database 411 depicted in FIG. 10, is the data structure which stores trigger information. A list of supported WIN triggers is maintained within this database. The TDB is the heart of WIN Trigger Environment on the MSC. One can redefine standard triggers as well as create customized and proprietary triggers with the TDB. The TDB stores the trigger number, trigger scope, DP, priority, criteria, and the query type for a particular trigger. The TDB binds all this information together to enable the maintenance of existing triggers, the creation of new triggers, the changing of priorities, the mapping of new messages, and the storage of TCEB expressions when they are utilized. The main functions of the TDB include the ability to hold the trigger definitions, drive the trigger arming process, and provide an interface through which the database may be edited.

Figure 11:
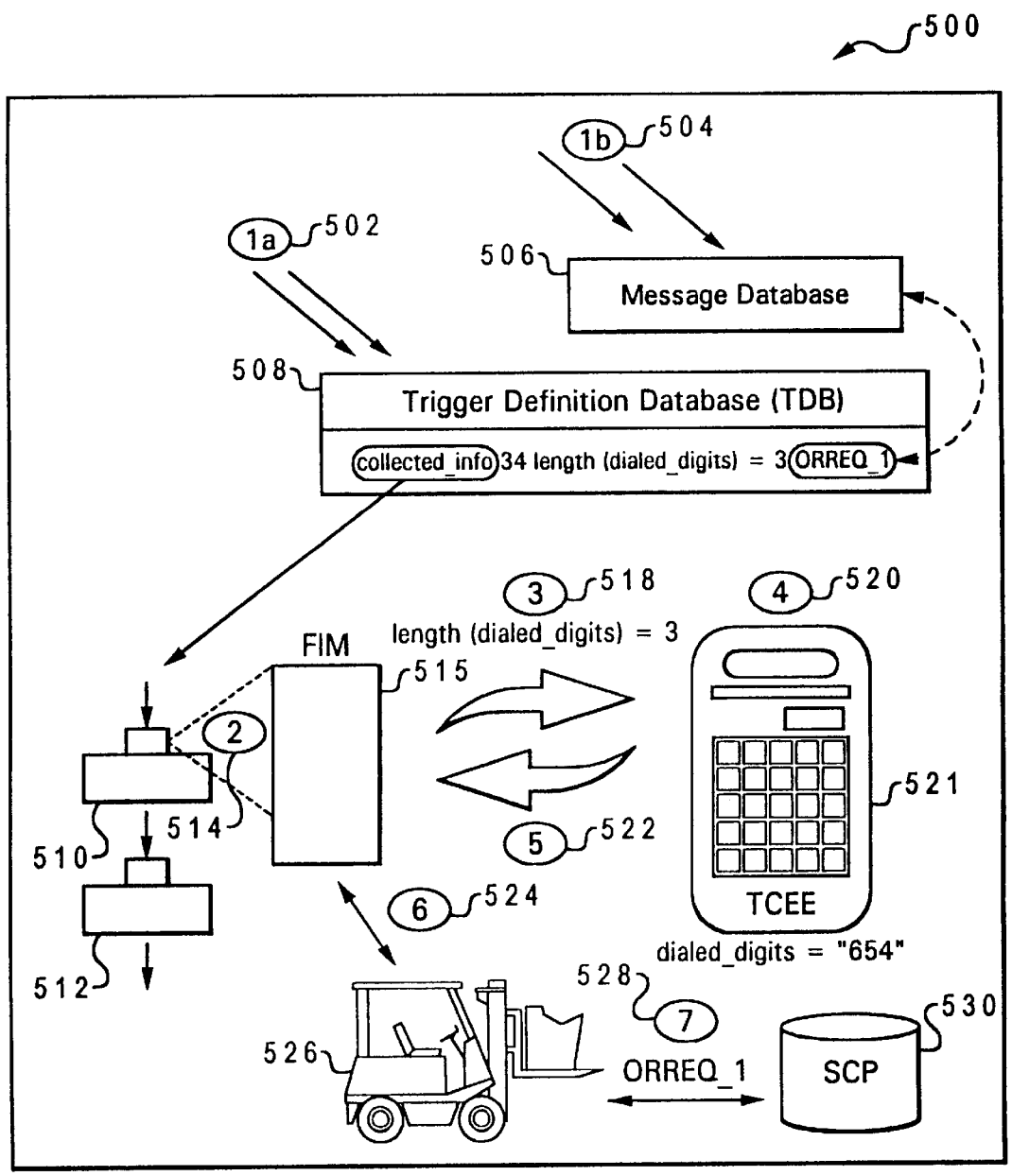
FIG. 11 illustrates a flow diagram illustrative of the WIN Trigger Environment process, in accordance with a preferred embodiment of the present invention.

FIG. 11 illustrates a flow diagram 500 illustrative of the WIN Trigger Environment process, in accordance with a preferred embodiment of the present invention. FIG. 11 depicts an example of a call made by a mobile subscriber which has dialed "654," and possesses a 3-digit trigger armed in its profile. As indicated at block 1a (502), the Trigger Definition Database (TDB) entry is created (i.e., through an interface with the user) and information is stored in the TDB (i.e., Trigger Definition Database 508). These steps are accomplished when configuring the system. As illustrated at block 1b (504), a message database entry is created (i.e., also through an interface with the user), and information is stored in the Message Database 506. The call origination progresses through a call model without detecting any triggers until it reaches the Collected_Info DP. The Collected_Info DP is illustrated by the following line within Trigger Definition Database 508 (which is analogous to Trigger Database 411 of FIG. 10):

collected_info 34 length (dialed_digits)=3 ORREQ_1

"ORREQ_1" represents an example of a customized message, as defined in the message database. Note that in FIG. 11, the dashed arrow located between "ORREQ_1" and message database 506 represents a database linkage. As illustrated at block 2 (514), the FIM (Feature Interaction Manager) looks at the armed triggers within the subscriber's profile (i.e., see trigger "34" in Trigger Definition Database 508), and determines that a particular expression must be evaluated. The FIM is indicated by blocks 510, 512 and 515. As depicted at block 3 (518), the expression "length(dialed_digits)=3" is taken from Trigger Definition Database 508 and passed to the Trigger Criteria Expression Evaluator (TCEE) 521. As illustrated at block 4 (520), the TCEE evaluates the expression by "looking" at the dialed digits (i.e., dialed_digits="654"), and determining that the length is "3" and returning a TRUE return value. As depicted at block 5 (522), the TRUE return value is passed back to the FIM. As indicated at block 6 (524), the FIM receives the TRUE return value, indicating that the trigger has been detected. The FIM then "looks" at Trigger Definition Database 508 to determine which message to issue. This is sent to the "Plug & Play" WIN messaging mechanism (i.e., this "sending" operation is illustrated by tractor block 526). Finally, as described at block 7 (528), the message database is utilized to issue the system-defined "message" "ORREQ_1" to the SCP 530 (i.e., recall that "SCP" is an acronym representing the term "Service Control Point," as described herein).

It is important to note that it is not a necessary feature of the present invention that both parties in a communications transaction be mobile cellular telephone users. In particular, an originator does not necessarily have to be a mobile cellular telephone. For example, if a terminating user is a mobile cellular telephone, and an individual located in a different city calls the terminating user, the terminating user may desire the call routed to a central dispatcher in order to service the call quickly. In this case, the originator may be a mobile cellular telephone located in the other city, or the originator may be a fixed landline that is always located in the other city.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for implementing a communications network having configurable control mechanisms for the identification and transference of particular types of communications data, said method comprising the steps of:

establishing detection points within a communications network at which transfer of control of communications data within said communications network can occur, wherein particular types of communications data transferred through said detection points may be identified; and associating with said detection points, removable configurable control mechanisms that manage the transference of communications data through said detection points, such that said removable configurable control mechanisms may be easily replaced and updated without deconstructing said communications network or extensively delaying communication services within said communications network.

2. The method of claim 1 wherein the step of establishing detection points within a communications network, wherein particular types of communications data transferred through said detection points may be identified, further comprises the step of:

establishing detection points at switching nodes within a communications network, wherein particular types of communications data transferred through said detection points may be identified.

3. The method of claim 2 wherein the step of associating with said detection points, removable configurable control mechanisms that manage the transference of communications data through said detection points, further comprises the step of:

associating with said detection points, removable configurable control mechanisms that manage the transference of communications data through said detection points, wherein said configurable control mechanisms include triggers that initiate the transfer of said communications data to external nodes according to predefined standards.

4. The method of claim 3 further comprising the step of:

establishing said predefined standards such that said predefined standards may be subsequently enhanced without deconstructing said communications network or extensively delaying communication services within said communications network.

5. The method of claim 4 further comprising the step of:

establishing triggers for said communications network that comprise:

detection criteria for detecting and identifying said particular types of communications data;

interface criteria for routing said particular types of communications data to said external node; and priority criteria for prioritizing said particular types of communications data.

6. The method of claim 5 wherein the step of establishing detection points within a communications network, wherein particular types of communications data transferred through said detection points may be identified, further comprises the step of:

establishing detection points within a communications network, wherein particular types of communications data transferred through said detection points may be identified, such that said communications network comprises a wireless or wireline communications network or a combination thereof.

7. The method of claim 6 wherein the step of associating with said detection points, removable configurable control mechanisms that manage the transference of communications data through said detection points, wherein said configurable control mechanisms include triggers that initiate the transfer of said communications data to external nodes according to predefined standards, further comprises the step of:

associating with said detection points, removable configurable control mechanisms that manage the transference of communications data through said detection points, wherein said configurable control mechanisms include triggers that initiate the transfer of said communications data to external nodes according to predefined standards, such that said external nodes comprise off-board service platforms.

8. The method of claim 7 further comprising the step of transferring said particular communications data to an off-board service platform, in response to initiation of a particular trigger.

9. The method of claim 8 further comprising the step of enhancing said configurable removable control mechanisms without altering said predefined standards.

10. The method of claim 9 wherein the step of establishing detection points within a communications network, wherein particular types of communications data transferred through said detection points may be identified, further comprises the step of:

establishing detection points within a communications network comprising an intelligent communications network, wherein particular types of communications data transferred through said detection points may be identified.

11. The method of claim 10 wherein the step of associating with said detection points, removable configurable control mechanisms that manage the transference of communications data through said detection points, such that said removable configurable control mechanisms may be easily replaced and updated without deconstructing said communications network or extensively delaying communication services within said communications network, further comprises the steps of:

selecting a particular configurable control mechanism; and replacing said particular configurable control mechanism with an enhanced configurable control mechanism, such that said removable configurable control mechanisms may be easily replaced and updated without deconstructing said communications network or extensively delaying communication services within said communications network.

12. A system for implementing a communications network having configurable control mechanisms for the identification and transference of particular types of communications data, said system comprising:

means for establishing detection points within a communications network at which transfer of control of communications data within said communications network can occur, wherein particular types of communications data transferred through said detection points may be identified; and means for associating with said detection points, removable configurable control mechanisms that manage the transference of communications data through said detection points, such that said removable configurable control mechanisms may be easily replaced and updated without deconstructing said communications network or extensively delaying communication services within said communications network.

13. The system of claim 12 wherein said means for establishing detection points within a communications network, wherein particular types of communications data transferred through said detection points may be identified, further comprises:

means for establishing detection points at switching nodes within said communications network, wherein particular types of communications data transferred through said detection points may be identified.

14. The system of claim 13 wherein said configurable control mechanisms include triggers that initiate the transfer of said communications data to external nodes according to predefined standards.

15. The system of claim 14 further comprising means for establishing said predefined standards such that said predefined standards may be subsequently enhanced without deconstructing said communications network or extensively delaying communication services within said communications network.

16. The system of claim 15 further comprising means for establishing triggers for said communications network, wherein said triggers comprise:

detection criteria for detecting and identifying said particular types of communications data;

interface criteria for routing said particular types of communications data to said external node; and priority criteria for prioritizing said particular types of communications data.

17. The system of claim 16 wherein said communications network comprises a wireless or wireline communications network or a combination thereof.

18. The system of claim 17 wherein said external nodes comprise off-board service platforms.

19. The system of claim 18 further comprising means for transferring said particular communications data to an off-board service platform, in response to initiation of a particular trigger.

20. The system of claim 19 further comprising means for enhancing said configurable removable control mechanisms without altering said predefined standards.

21. The system of claim 20 wherein said communications network further comprises an intelligent communications network.

22. The system of claim 21 wherein said means for associating with said detection points, removable configurable control mechanisms that manage the transference of communications data through said detection points, such that said removable configurable control mechanisms may be easily replaced and updated without deconstructing said communications network or extensively delaying communication services within said communications network, further comprises:

means for selecting a particular configurable control mechanism; and means for replacing said particular configurable control mechanism with an enhanced configurable control mechanism, such that said removable configurable control mechanisms may be easily replaced and updated without deconstructing said communications network or extensively delaying communication services within said communications network.

23. A program product residing in computer memory in a computer for implementing a communications network having configurable control mechanisms for the identification and transference of particular types of communications data, said program product comprising:

instruction means residing in a computer memory for establishing detection points within a communications network at which transfer of control of communications data within said communications network can occur, wherein particular types of communications data transferred through said detection points may be identified; and instruction means residing in a computer memory for associating with said detection points, removable configurable control mechanisms that manage the transference of communications data through said detection points, such that said removable configurable control mechanisms may be easily replaced and updated without deconstructing said communications network or extensively delaying communication services within said communications network.

24. The program product of claim 23 wherein said instruction means residing in a computer memory for establishing detection points within a communications network, wherein particular types of communications data transferred through said detection points may be identified, further comprises:

instruction means residing in a computer memory for establishing detection points at switching nodes within said communications network, wherein particular types of communications data transferred through said detection points may be identified.

25. The program product of claim 24 wherein said configurable control mechanisms include triggers that initiate the transfer of said communications data to external nodes according to predefined standards.

26. The program product of claim 25 further comprising instruction means residing in a computer memory for establishing said predefined standards such that said predefined standards may be subsequently enhanced without deconstructing said communications network or extensively delaying communication services within said communications network.

27. The program product of claim 26 further comprising instruction means residing in a computer memory for establishing triggers for said communications network, wherein said triggers comprise:

detection criteria for detecting and identifying said particular types of communications data;

interface criteria for routing said particular types of communications data to said external node; and priority criteria for prioritizing said particular types of communications data.

28. The program product of claim 27 wherein said communications network comprises a wireless or wireline communications network or a combination thereof.

29. The program product of claim 28 wherein said external nodes comprise off-board service platforms.

30. The program product of claim 29 further comprising instruction means residing in a computer memory for transferring said particular communications data to an off-board service platform, in response to initiation of a particular trigger.

31. The program product of claim 30 further comprising instruction means residing in a computer memory for enhancing said configurable removable control mechanisms without altering said predefined standards.

32. The program product of claim 31 wherein said communications network further comprises an intelligent communications network.

33. The program product of claim 32 wherein said instruction means residing in a computer memory for associating with said detection points, removable configurable control mechanisms that manage the transference of communications data through said detection points, such that said removable configurable control mechanisms may be easily replaced and updated without deconstructing said communications network or extensively delaying communication services within said communications network, further comprises:

instruction means residing in a computer memory for selecting a particular configurable control mechanism; and instruction means residing in a computer memory for replacing said particular configurable control mechanism with an enhanced configurable control mechanism, such that said removable configurable control mechanisms may be easily replaced and updated without deconstructing said communications network or extensively delaying communication services within said communications network.

34. The program product of claim 33 wherein each of said instruction means within said computer system further comprises signal bearing media.

35. The program product of claim 34 wherein said signal bearing media further comprises transmission media.

36. The program product of claim 34 wherein said signal bearing media further comprises recordable media.

* * * * *